(12) United States Patent
Guo et al.

(10) Patent No.: US 10,609,697 B2
(45) Date of Patent: Mar. 31, 2020

(54) COMMUNICATION METHOD BASED ON NON-ORTHOGONAL TRANSMISSION, AND DEVICE

(71) Applicant: HUAWEI TECHNOLOGIES CO., LTD., Shenzhen, Guangdong (CN)

(72) Inventors: Zhiheng Guo, Beijing (CN); Hai Wu, Beijing (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/719,752

(22) Filed: Sep. 29, 2017

(65) Prior Publication Data

US 2018/0027535 A1 Jan. 25, 2018

Related U.S. Application Data

(63) Continuation of application No. PCT/CN2015/075766, filed on Apr. 2, 2015.

(51) Int. Cl.
*H04W 72/04* (2009.01)
*H04L 5/00* (2006.01)
(Continued)

(52) U.S. Cl.
CPC ......... *H04W 72/042* (2013.01); *H04W 72/04* (2013.01); *H04W 72/0473* (2013.01);
(Continued)

(58) Field of Classification Search
CPC . H04W 48/08; H04W 52/346; H04W 72/082; H04W 72/121; H04W 74/006;
(Continued)

(56) References Cited

U.S. PATENT DOCUMENTS

| | | | | |
|---|---|---|---|---|
| 2005/0094675 A1* | 5/2005 | Bhushan | ............... | H04W 48/08 370/527 |
| 2013/0196700 A1* | 8/2013 | Tiirola | ................... | H04J 11/004 455/501 |

(Continued)

FOREIGN PATENT DOCUMENTS

| | | |
|---|---|---|
| CN | 1891008 A | 1/2007 |
| CN | 102118872 A | 7/2011 |

(Continued)

OTHER PUBLICATIONS

International Search Report dated Dec. 28, 2015 in corresponding International Patent Application No. PCT/CN2015/075766.

(Continued)

*Primary Examiner* — Habte Mered
*Assistant Examiner* — Prince A Mensah
(74) *Attorney, Agent, or Firm* — Slater Matsil, LLP

(57) ABSTRACT

The present invention discloses a communication method based on non-orthogonal transmission, and a device. The method includes: receiving, by first user equipment UE, first downlink control information sent by a base station, where the first downlink control information includes a downlink control parameter of the first UE and an index of a radio network temporary identifier RNTI of second UE; receiving, by the first UE, second downlink control information sent by the base station; and obtaining, by the first UE, a data signal of the first UE according to the index of the RNTI of the second UE, the downlink control parameter of the second UE, the data signal of the associated user equipment group, and the downlink control parameter of the first UE. Signaling overheads can be reduced according to embodiments of the present invention.

20 Claims, 4 Drawing Sheets

(51) Int. Cl.
*H04W 52/16* (2009.01)
*H04W 72/12* (2009.01)

(52) U.S. Cl.
CPC .......... *H04L 5/0007* (2013.01); *H04L 5/0037* (2013.01); *H04L 5/0053* (2013.01); *H04L 5/0091* (2013.01); *H04W 52/16* (2013.01); *H04W 72/1289* (2013.01)

(58) Field of Classification Search
CPC ... H04W 52/16; H04W 72/04; H04W 72/042; H04W 72/0473; H04W 72/1289; H04J 11/0026; H04J 11/003; H04J 11/004; H04J 11/0043; H04J 11/0059; H04L 5/0007; H04L 5/0037; H04L 5/0053; H04L 5/0091
See application file for complete search history.

(56) References Cited

U.S. PATENT DOCUMENTS

| | | | |
|---|---|---|---|
| 2013/0196701 A1 | 8/2013 | Tirola | |
| 2015/0009911 A1 | 1/2015 | Li et al. | |
| 2015/0312074 A1* | 10/2015 | Zhu | H04L 27/2627 370/329 |
| 2015/0351081 A1* | 12/2015 | Zhu | H04J 11/003 370/329 |
| 2016/0029395 A1* | 1/2016 | Kim | H04J 11/004 370/329 |
| 2016/0066345 A1* | 3/2016 | Sun | H04W 74/006 370/329 |
| 2016/0205695 A1 | 7/2016 | Kishiyama et al. | |

FOREIGN PATENT DOCUMENTS

| | | |
|---|---|---|
| CN | 103220690 A | 7/2013 |
| CN | 104205684 A | 12/2014 |
| CN | 104284423 A | 1/2015 |
| WO | WO 2013/113671 A1 | 8/2013 |
| WO | WO2013113780 | 8/2013 |
| WO | WO2015025847 | 2/2015 |

OTHER PUBLICATIONS

3GPP TS 36.212 V12.4.0; $3^{rd}$ Generation Partnership Project; Technical Specification Group Radio Access Network; Evolved Universal Terrestrial Radio Access (E-UTRA), "Multiplexing and channel coding (Release 12)," Sophia Antipolis, France, Mar. 2015, pp. 1-94.

3GPP TS 36.211 V12.5.0; $3^{rd}$ Generation Partnership Project; Technical Specification Group Radio Access Network; Evolved Universal Terrestrial Radio Access (E-UTRA), "Physical channels and modulation (Release 12)," Sophia Antipolis, France, Mar. 2015, pp. 1-136.

Benjebbour, Anass et al., *Concept and Practical Considerations of Non-orthogonal Multiple Access (NOMA) for Future Radio Access*, 2013 International Symposium on Intelligent Signal Processing and Communication Systems, IEEE, Nov. 12, 2013, pp. 770-774.

Extended European Search Report, dated Feb. 15, 2018, in European Application No. 15886961.0 (12 pp.).

Chinese Office Action for Chinese Application No. 201580065167.9 dated Apr. 2, 2019.

Chinese Search Report for Chinese Application No. 201580065167.9 dated Mar. 24, 2019.

* cited by examiner

COMMUNICATION METHOD BASED ON NON-ORTHOGONAL TRANSMISSION, AND DEVICE

CROSS-REFERENCE TO RELATED APPLICATIONS

This application is a continuation of International Application No. PCT/CN2015/075766, filed on Apr. 2, 2015, the disclosure of which is hereby incorporated by reference in its entirety.

TECHNICAL FIELD

Embodiments of the present invention relate to the communications field, and in particular, to a communication method based on non-orthogonal transmission, and a device.

BACKGROUND

In a Long Term Evolution (LTE)/Long Term Evolution Advanced (LTE-A) communications system, an orthogonal frequency division multiple access (OFDMA) manner is usually used as a downlink multiple access manner. A main characteristic of the orthogonal frequency division multiple access manner is that different users use different time-frequency resources to ensure that there is no interference between signals received by different users, so as to achieve simple reception on a user side. However, when the orthogonal frequency division multiple access manner is used for communication, utilization of a time-frequency resource is relatively low, and consequently, an overall transmission rate of the communications system is limited.

In a non-orthogonal multiple access (NOMA) transmission manner, information of multiple users can be transmitted on a single resource element (RE). Compared with the OFDMA, the NOMA improves an overall transmission rate of a system. In a NOMA technology, transmission signals of multiple users are superimposed in a time-frequency domain, and different power is allocated to different users to ensure accurate reception on the user side. On a reception side, a cell-edge user or a user relatively far from a base station treats a signal of a cell-center user as interference, so as to achieve accurate demodulation. The cell-center user or a user relatively close to the base station needs to first detect a signal of the cell-edge user, then use an interference cancellation algorithm, and finally accurately demodulate a signal of the cell-center user or the user relatively close to the base station.

However, according to a communications technology based on the NOMA, more downlink control parameters need to be transmitted, and signaling overheads are larger.

SUMMARY

Embodiments of the present invention provide a communication method based on non-orthogonal transmission, a device, and a system, so as to reduce signaling transmission overheads.

According to a first aspect, an embodiment of the present invention provides a communication method based on non-orthogonal transmission, including:

receiving, by first user equipment UE, first downlink control information sent by a base station, where the first downlink control information includes a downlink control parameter of the first UE and an index of a radio network temporary identifier RNTI of second UE, and the first UE and the second UE belong to one associated user equipment group;

receiving, by the first UE, second downlink control information sent by the base station, where the second downlink control information includes a downlink control parameter of the second UE;

receiving, by the first UE, a data signal of the associated user equipment group sent by the base station, where the data signal of the associated user equipment group includes a data signal of the first UE and a data signal of the second user equipment; and obtaining, by the first UE, the data signal of the first UE according to the index of the RNTI of the second UE, the downlink control parameter of the second UE, the data signal of the associated user equipment group, and the downlink control parameter of the first UE.

With reference to the first aspect, in a first implementation of the first aspect, the obtaining, by the first UE, the data signal of the first UE according to the index of the RNTI of the second UE, the downlink control parameter of the second UE, the data signal of the associated user equipment group, and the downlink control parameter of the first UE includes:

obtaining, by the first UE, the data signal of the second UE according to the index of the RNTI of the second UE, the downlink control parameter of the second UE, and the data signal of the associated user equipment group; and obtaining, by the first UE, the data signal of the first UE according to the data signal of the second UE, the downlink control parameter of the first UE, and the data signal of the associated user equipment group.

With reference to the first aspect and the foregoing implementation of the first aspect, in a second implementation of the first aspect, the first downlink control information further includes time-frequency location information of the second downlink control information, and the receiving, by the first UE, second downlink control information sent by the base station includes:

receiving, by the first UE, the second downlink control information according to the time-frequency location information.

With reference to the first aspect and the foregoing implementations of the first aspect, in a third implementation of the first aspect, the obtaining, by the first UE, the data signal of the second UE according to the index of the RNTI of the second UE, the downlink control parameter of the second UE, and the data signal of the associated user equipment group includes:

determining, by the first UE and from a preconfigured parameter comparison table, the RNTI of the second UE and a corresponding semi-statically configured parameter according to the index of the RNTI of the second UE; and obtaining, by the first UE, the data signal of the second UE from the data signal of the associated user equipment group according to the RNTI of the second UE, the corresponding semi-statically configured parameter, and the downlink control parameter of the second UE.

With reference to the first aspect and the foregoing implementations of the first aspect, in a fourth implementation of the first aspect, before the receiving, by first UE, first downlink control information sent by a base station, the method further includes:

receiving, by the first UE, an RNTI parameter comparison table of the second UE sent by the base station; and determining, by the first UE, the data signal of the second UE according to the index of the RNTI of the second UE, the downlink control parameter of the second UE, and the data signal of the associated user equipment group includes:

determining, by the first UE, the RNTI of the second UE according to the index of the RNTI of the second UE and the RNTI parameter comparison table of the second UE; and obtaining, by the first UE, the data signal of the second UE according to the RNTI of the second UE, the downlink control parameter of the second UE, and the data signal of the associated user equipment group.

With reference to the first aspect and the foregoing implementations of the first aspect, in a fifth implementation of the first aspect, the first downlink control information further includes an identity of the first UE, and the identity is used to indicate that the first UE is cell-center UE.

With reference to the first aspect and the foregoing implementations of the first aspect, in a sixth implementation of the first aspect, the first downlink control information further includes pairing information and/or power allocation ratio information.

With reference to the first aspect and the foregoing implementations of the first aspect, in a seventh implementation of the first aspect, information included in the first downlink control information is coded by means of joint coding.

According to a second aspect, an embodiment of the present invention provides user equipment UE, including:

a communications unit, configured to receive first downlink control information sent by a base station, where the first downlink control information includes a downlink control parameter of the user equipment and an index of a radio network temporary identifier RNTI of second UE, the user equipment is first UE in an associated user equipment group, and the associated user equipment group further includes the second UE, where the communications unit is further configured to receive second downlink control information sent by the base station, where the second downlink control information includes a downlink control parameter of the second UE; and the communications unit is further configured to receive a data signal of the associated user equipment group sent by the base station, where the data signal of the associated user equipment group includes a data signal of the first UE and a data signal of the second UE; and a processing unit, configured to obtain the data signal of the first UE according to the index of the RNTI of the second UE, the downlink control parameter of the second UE, the data signal of the associated user equipment group, and the downlink control parameter of the first UE.

With reference to the second aspect, in a first implementation of the second aspect, the first downlink control information further includes time-frequency location information of the second downlink control information, and the communications unit is specifically configured to receive the second downlink control information according to the time-frequency location information.

With reference to the second aspect and the foregoing implementation of the second aspect, in a second implementation of the second aspect, the processing unit is specifically configured to:

determine, from a preconfigured parameter comparison table, the RNTI of the second UE and a corresponding semi-statically configured parameter according to the index of the RNTI of the second UE; and obtain the data signal of the second UE from the data signal of the associated user equipment group according to the RNTI of the second UE, the corresponding semi-statically configured parameter, and the downlink control parameter of the second UE.

With reference to the second aspect and the foregoing implementations of the second aspect, in a third implementation of the second aspect, the communications unit is further configured to receive an RNTI parameter comparison table of the second UE sent by the base station; and the processing unit is specifically configured to determine the RNTI of the second UE according to the index of the RNTI of the second UE and the RNTI parameter comparison table of the second UE; and obtain the data signal of the second UE according to the RNTI of the second UE, the downlink control parameter of the second UE, and the data signal of the associated user equipment group.

With reference to the second aspect and the foregoing implementations of the second aspect, in a fourth implementation of the second aspect, the first downlink control information further includes an identity of the first UE, and the identity is used to indicate that the first UE is cell-center UE.

With reference to the second aspect and the foregoing implementations of the second aspect, in a fifth implementation of the second aspect, information included in the first downlink control information is coded by means of joint coding.

With reference to the second aspect, in a sixth implementation of the second aspect, that a processing unit is configured to obtain the data signal of near-end UE according to the index of the RNTI of the second UE, the downlink control parameter of the second UE, the data signal of the associated user equipment group, and the downlink control parameter of the first UE includes:

the processing unit is configured to obtain the data signal of the second UE according to the index of the RNTI of the second UE, the downlink control parameter of the second UE, and the data signal of the associated user equipment group; and the processing unit is further configured to obtain the data signal of the first UE according to the data signal of the second UE, the downlink control parameter of the first UE, and the data signal of the associated user equipment group.

According to a third aspect, an embodiment of the present invention provides a communication method based on non-orthogonal transmission, including:

sending, by a base station, first downlink control information, where the first downlink control information includes a downlink control parameter of first user equipment UE and an index of a radio network temporary identifier RNTI of second UE;

sending, by the base station, second downlink control information, where the second downlink control information includes a downlink control parameter of the second UE, and the first UE and the second UE belong to one associated user equipment group; and sending, by the base station, a data signal of the associated user equipment group, where the data signal of the associated user equipment group includes data of the first UE and data of the second UE.

With reference to the third aspect, in a first implementation of the third aspect, the first downlink control information further includes an identity of the first UE, and the identity is used to indicate that the first UE is cell-center UE.

With reference to the third aspect and the foregoing implementation of the third aspect, in a second implementation of the third aspect, the first downlink control information further includes time-frequency location information of the second downlink control information and/or power allocation ratio information.

With reference to the third aspect and the foregoing implementations of the third aspect, in a third implementation of the third aspect, information included in the first downlink control information is coded by means of joint coding.

According to a fourth aspect, an embodiment of the present invention provides a base station, including:

a communications unit, configured to send first downlink control information, where the first downlink control information includes a downlink control parameter of first user equipment UE and an index of a radio network temporary identifier RNTI of second UE, where the communications unit is further configured to send second downlink control information, where the second downlink control information includes a downlink control parameter of the second UE, and the first UE and the second UE belong to one associated user equipment group; and the communications unit is further configured to send a data signal of the associated user equipment group to the first UE, where the data signal of the associated user equipment group includes data of the first UE and data of the second UE.

With reference to the fourth aspect, in a first implementation of the fourth aspect, the first downlink control information further includes an identity of the first UE, and the identity is used to indicate that the first UE is cell-center UE.

With reference to the fourth aspect and the foregoing implementation of the fourth aspect, in a second implementation of the fourth aspect, the downlink control information further includes pairing information and/or power allocation ratio information.

With reference to the fourth aspect and the foregoing implementations of the fourth aspect, in a third implementation of the fourth aspect, information included in the downlink control information is coded by means of joint coding.

According to a fifth aspect, an embodiment of the present invention provides a communication method based on non-orthogonal transmission, including:

receiving, by first user equipment UE, downlink control information sent by a base station, where the downlink control information includes a downlink control parameter of the first UE and a downlink control parameter of second UE, and the first UE and the second UE belong to one associated user equipment group;

receiving, by the first UE, a data signal of the associated user equipment group sent by the base station, where the data signal of the associated user equipment group includes a data signal of the first UE and a data signal of the second UE; and obtaining, by the first UE, the data signal of the first UE according to a preset radio network temporary identifier RNTI of the second UE, the downlink control parameter of the second UE, the data signal of the associated user equipment group, and the downlink control parameter of the first UE.

With reference to the fifth aspect, in a second implementation of the fifth aspect, the obtaining, by the first UE, the data signal of the first UE according to a preset radio network temporary identifier RNTI of the second UE, the downlink control parameter of the second UE, the data signal of the associated user equipment group, and the downlink control parameter of the first UE includes:

obtaining, by the first UE, the data signal of the second UE according to the preset radio network temporary identifier RNTI of the second UE, the downlink control parameter of the second UE, and the data signal of the associated user equipment group; and obtaining, by the first UE, the data signal of the first UE according to the downlink control parameter of the first UE, the data signal of the second UE, and the data signal of the associated user equipment group.

With reference to the fifth aspect, in a third implementation of the fifth aspect, the downlink control information includes an identity of the first UE, and the identity is used to indicate that the first UE is cell-center UE.

With reference to the fifth aspect and the foregoing implementations of the fifth aspect, in a fourth implementation of the fifth aspect, the downlink control information further includes pairing information and/or power allocation ratio information.

With reference to the fifth aspect and the foregoing implementations of the fifth aspect, in a fifth implementation of the fifth aspect, information included in the downlink control information is coded by means of joint coding.

According to a sixth aspect, an embodiment of the present invention provides user equipment, including:

a communications unit, configured to receive downlink control information sent by a base station, where the downlink control information includes a downlink control parameter of the user equipment and a downlink control parameter of second UE, the user equipment is first UE in an associated user equipment group, and the associated user equipment group further includes the second UE, where the communications unit is further configured to receive a data signal of the associated user equipment group sent by the base station, where the data signal of the associated user equipment group includes a data signal of the first UE and a data signal of the second UE; and a processing unit, configured to obtain the data signal of the first UE according to a preset radio network temporary identifier RNTI of the second UE, the downlink control parameter of the second UE, the data signal of the associated user equipment group, and the downlink control parameter of the first UE.

With reference to the sixth aspect, in a second implementation of the sixth aspect, the processing unit is specifically configured to:

obtain the data signal of the second UE according to the preset radio network temporary identifier RNTI of the second UE, the downlink control parameter of the second UE, and the data signal of the associated user equipment group; and obtain the data signal of the first UE according to the downlink control parameter of the user equipment, the data signal of the second UE, and the data signal of the associated user equipment group.

With reference to the sixth aspect, in a third implementation of the sixth aspect, the downlink control information includes an identity of the first UE, and the identity is used to indicate that the first UE is cell-center UE.

With reference to the sixth aspect and the foregoing implementations of the sixth aspect, in a fourth implementation of the sixth aspect, the downlink control information further includes pairing information and/or power allocation ratio information.

With reference to the sixth aspect and the foregoing implementations of the sixth aspect, in a fifth implementation of the sixth aspect, information included in the downlink control information is coded by means of joint coding.

According to a seventh aspect, an embodiment of the present invention provides a communication method based on non-orthogonal transmission, including:

sending, by a base station, downlink control information, where the downlink control information includes a downlink control parameter of first user equipment UE and a downlink control parameter of second UE, and the first UE and the second UE belong to one associated user equipment group; and sending, by the base station, a data signal of the associated user equipment group, where a data signal of the second UE in the data signal of the associated user equipment group is scrambled by using a preset radio network temporary identifier RNTI of the second UE.

With reference to the seventh aspect, in a second implementation of the seventh aspect, the downlink control information further includes an identity of the first UE, and the identity is used to indicate that the first UE is cell-center UE.

With reference to the seventh aspect and the foregoing implementation of the seventh aspect, in a third implementation of the seventh aspect, the downlink control information further includes pairing information and/or power allocation ratio information.

With reference to the seventh aspect and the foregoing implementations of the seventh aspect, in a fourth implementation of the seventh aspect, information included in the downlink control information is coded by means of joint coding.

With reference to the seventh aspect and the foregoing implementations of the seventh aspect, in a fifth implementation of the seventh aspect, the preset radio network temporary identifier RNTI of the second UE is a group/common RNTI.

According to an eighth aspect, an embodiment of the present invention provides a base station, including:

a communications unit, configured to send downlink control information to first user equipment UE, where the downlink control information includes a downlink control parameter of the first UE and a downlink control parameter of second UE, and the first UE and the second UE belong to one associated user equipment group, where the communications unit is further configured to send a data signal of the associated user equipment group to the first UE, where a data signal of the second UE in the data signal of the associated user equipment group is scrambled by using a preset radio network temporary identifier RNTI of the second UE.

With reference to the eighth aspect, in a second implementation of the eighth aspect, the downlink control information further includes an identity of the first UE, and the identity is used to indicate that the first UE is cell-center UE.

With reference to the eighth aspect and the foregoing implementation of the eighth aspect, in a third implementation of the eighth aspect, the downlink control information further includes pairing information and/or power allocation ratio information.

With reference to the eighth aspect and the foregoing implementations of the eighth aspect, in a fourth implementation of the eighth aspect, information included in the downlink control information is coded by means of joint coding.

With reference to the eighth aspect and the foregoing implementations of the eighth aspect, in a fifth implementation of the eighth aspect, the preset radio network temporary identifier RNTI of the second UE is a group/common RNTI.

According to another aspect, an embodiment of the present invention provides a communications system, and the system includes the base station and the UE that are described in the foregoing aspects. In addition, the present invention further provides a computer storage medium, and the computer storage medium includes a program used to execute the foregoing aspects.

Based on the foregoing technical solutions, in the embodiments of the present invention, a base station sends an index of an RNTI and a downlink control parameter of second user equipment to first user equipment, and does not need to send an RNTI that occupies relatively large space. In this way, the first user equipment may recover a signal of the first user equipment from a received overlapping signal according to the index of the RNTI and the downlink control parameter. Signaling overheads can be reduced according to the communication method provided in the embodiments of the present invention.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, Universal Mobile Telecommunications System (UMTS), and a Worldwide Interoperability for Microwave Access (WiMAX) communications system.

It should also be understood that in the embodiments of the present invention, user equipment (UE) may be referred to as a terminal, a mobile station (MS), a mobile terminal, and the like. The user equipment may communicate with one or more core networks through a radio access network (RAN). For example, the user equipment may be a mobile phone (also referred to as a cellular phone) or a computer with a mobile terminal. For example, the user equipment may also be a portable, pocket-sized, handheld, computer built-in, or in-vehicle mobile apparatus, which exchanges voice and/or data with the radio access network. For ease of description, these devices are collectively referred to as user equipment or UE in this specification.

In the embodiments of the present invention, a base station (Base Station, BS) may be a base transceiver station (BTS) in the GSM or the CDMA, may be a NodeB (NB) in the WCDMA, may be an evolved NodeB (evolved Node B, eNB or e-NodeB) in the LTE, or may be a base station in another evolved network, which is not limited in the present invention. However, for ease of description, these devices are collectively referred to as a base station or a BS.

Figure 1:
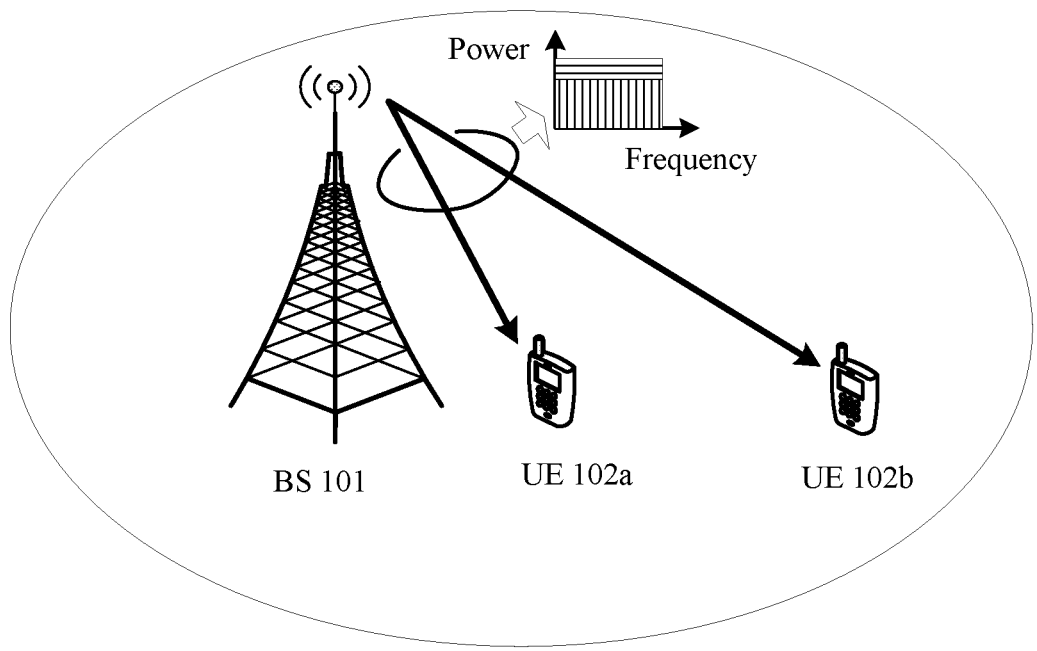
FIG. 1 is an architectural diagram of a communications system to which a communication method based on non-orthogonal transmission is applied according to an embodiment of the present invention.

FIG. 1 is an architectural diagram of a communications system to which a communication method based on non-orthogonal transmission is applied according to an embodiment of the present invention. As shown in FIG. 1, based on a NOMA technology, a base station 101 may communicate with user equipment (102a and 102b). The user equipment 102a is cell-center UE, and the user equipment 102b is cell-edge UE. Specifically, the base station may determine whether user equipment is cell-center UE or cell-edge UE according to information such as a signal-to-noise ratio, a path loss, or a geographical location. It may be understood that user equipment may serve as cell-center UE or serve as cell-edge UE, due to mobility of the user equipment. For cell-center UE, the base station may use relatively low transmit power; and for cell-edge UE, the base station uses relatively high transmit power. This is not limited in this embodiment of the present invention. In addition, cell-center UE and cell-edge UE are relative concepts, but not absolute geographical concepts. To avoid ambiguity, the following uses cell-center UE (or may be referred as near-end user equipment) and cell-edge UE (or may be referred to as far-end user equipment) as examples for description.

In a communication process, the user equipment 102a (first user equipment) may be paired with the user equipment 102b (second user equipment) as a group, that is, an associated user equipment group. The associated user equipment group may include cell-center UE (such as the UE 102a) and cell-edge UE (such as the UE 102b). In this way, the base station 101 may send transmission signals of the user equipment 102a and the user equipment 102b by superimposing the transmission signals on a same time-frequency resource or partially overlapping time-frequency resources. That is, a signal sent by the base station 101 includes a signal of the user equipment 102a and a signal of the user equipment 102b, and the signals of the user equipment 102a and the user equipment 102b have different power. It should be understood that multiple UEs may be formed into one associated user equipment group, and a quantity of user equipment in the associated user equipment group is not limited in this embodiment of the present invention. Preferably, the associated user equipment group includes at least one near-end UE and one far-end UE. For ease of description, the following uses pairing of two user equipments as an example for description.

After the user equipment 102b receives the signal sent by the base station 101, because the signal of the user equipment 102a has relatively small power, the user equipment 102b may accurately demodulate the signal of the user equipment 102b directly according to a normal process. After receiving the signal sent by the base station 101, the user equipment 102a needs to first demodulate the signal of the user equipment 102b according to the process of the user equipment 102b, and then eliminate the signal of the user equipment 102b to demodulate the signal of the user equipment 102a.

In the foregoing process of demodulating the signal of the user equipment 102b, the user equipment 102a needs to first obtain some parameters, such as a radio network temporary identifier (RNTI) and a downlink control parameter of the user equipment 102b. Specifically, the downlink control parameter may include one or more of the following parameters: a modulation and coding scheme (MCS), a transmission mode, a redundancy version (RV), and the like.

This embodiment of the present invention provides a communication method based on non-orthogonal transmission, so that signaling overheads may be reduced in a process of transmitting the RNTI and the downlink control parameter of the user equipment 102b. The following describes the embodiments of the present invention in further details with reference to a specific example.

Figure 2:
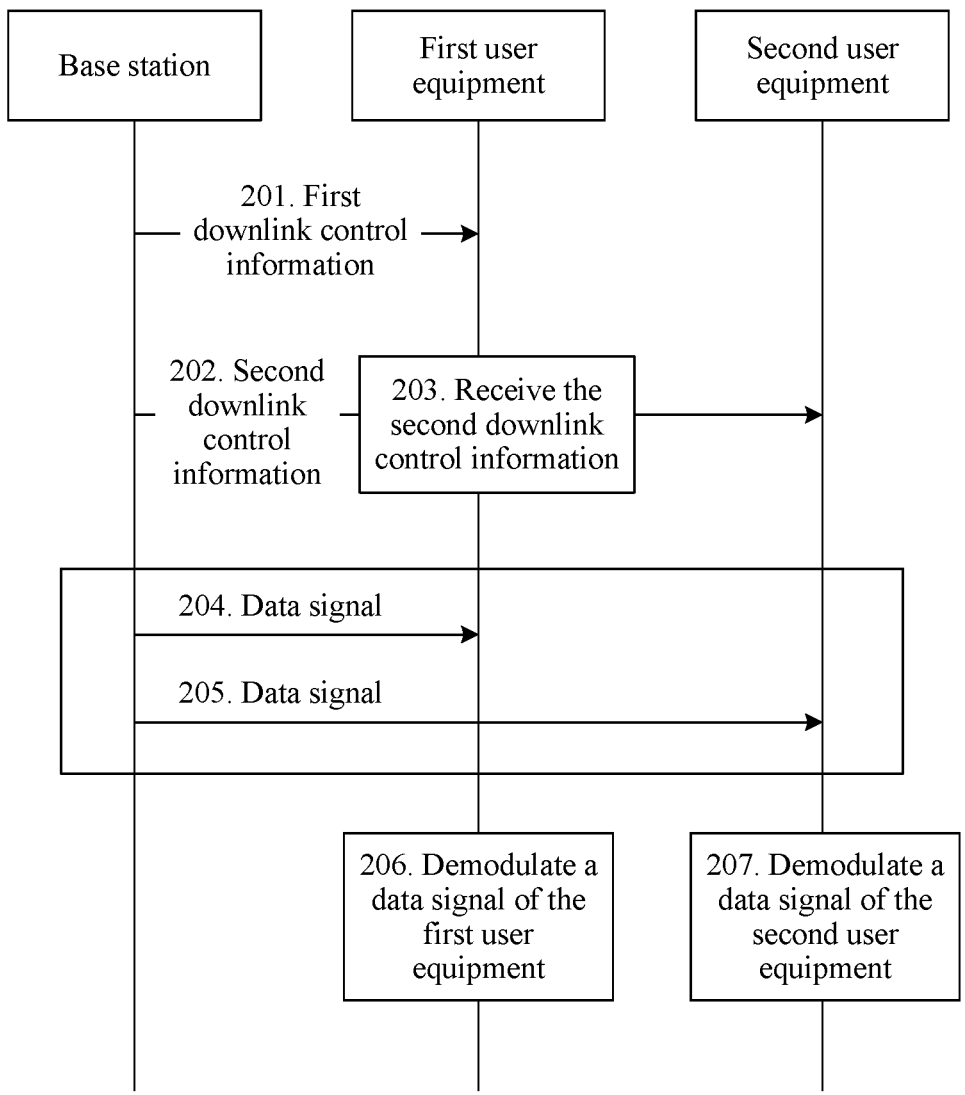
FIG. 2 is a schematic flowchart of a communication method based on non-orthogonal transmission according to an embodiment of the present invention.

FIG. 2 is a schematic flowchart of a communication method based on non-orthogonal transmission according to an embodiment of the present invention. The method may be applied to the network scenario shown in FIG. 1. First UE and second UE are two UEs in an associated user equipment group. Preferably, the first UE is near-end UE, and the second UE is far-end UE. For ease of description, preferably, that the first UE serves as near-end UE and the second UE serves as far-end UE is used as an example for the following description. It may be understood that this is not limited in this embodiment of the present invention.

It may be understood that the accompanying drawing is merely illustrative, and a sequence number in the drawing does not necessarily represent a time order. For example, time orders of parts 201, 202, 204, and 205 in the drawing are not limited, and the parts 201, 202, 204, and 205 only illustratively show a flow of control information or a data signal.

201. A base station sends first downlink control information to first UE (near-end UE).

The first downlink control information includes a downlink control parameter of the first UE. The first downlink control information may further include a radio network temporary identifier RNTI of second UE or an index of the RNTI of the second UE. The first UE and the second UE belong to a same associated user equipment group. For example, near-end UE is associated with far-end UE to form an associated user equipment group, and then transmission signals of the associated user equipment group are sent by being superimposed on a same time-frequency resource or partially overlapping time-frequency resources.

The downlink control parameter includes a parameter required to demodulate data. A type of the parameter may be different in different scenarios. Specifically, the downlink control parameter may include an MCS, a transmission mode, an RV, and the like, and this is not limited in this embodiment of the present invention.

The first UE receives the first downlink control information.

For example, the near-end UE detects the downlink control information sent by the base station, for example, may obtain the downlink control information in a blind detection manner.

It should be understood that UE may determine whether the UE is near-end UE according to received downlink control information. For example, UE may determine whether the UE is near-end UE according to a format of downlink control information or information included in downlink control information. In a design, the first downlink control information may include identity information. The identity information indicates whether UE that receives the first downlink control information is near-end UE. In another design, when receiving the first downlink control information and finding that the first downlink control information includes an RNTI or an index of an RNTI, UE determines that the UE is near-end UE. It should be understood that these examples are merely intended to help a person skilled in the art better understand this embodiment of the present invention, but are not intended to limit the scope of this embodiment of the present invention.

202. The base station sends second downlink control information to second UE (far-end UE). The second downlink control information includes a downlink control parameter of the far-end UE.

The second UE receives the second downlink control information sent by the base station.

In part 203, the near-end UE receives the second downlink control information sent by the base station. For example, the near-end UE obtains, in a blind detection manner or another manner, the second downlink control information sent by the base station to the far-end UE.

For example, the UE may receive, in the blind detection manner, the downlink control parameter of the second UE for subsequent serial interference cancellation. For another example, the UE may obtain a location of the downlink control parameter of the second UE according to preconfigured information, and then receive the second downlink control information on a corresponding time-frequency resource. It should be noted that these examples are merely intended to help a person skilled in the art better understand this embodiment of the present invention, but are not intended to limit the scope of this embodiment of the present invention.

In parts 204 and 205, the base station sends a data signal of an associated user equipment group. The data signal of the associated UE group includes a data signal of the near-end UE and a data signal of the far-end UE.

For example, the base station combines the data signal of the far-end UE and the data signal of the near-end UE into one signal, and sends the signal to the near-end UE and the far-end UE in the associated UE group. The near-end UE and the far-end UE separately receive the data signal of the associated UE group sent by the base station.

In part 206, the near-end UE obtains a data signal of the near-end UE according to an index of an RNTI of the far-end UE, the downlink control parameter of the far-end UE, the data signal of the associated UE group, and a downlink control parameter of the near-end UE.

For example, the near-end UE may first obtain the data signal of the far-end UE according to the index of the RNTI of the far-end UE, the downlink control parameter of the far-end UE, and the data signal of the associated UE group, and then obtain the data signal of the near-end UE according to the data signal of the far-end UE, the downlink control parameter of the near-end UE, and the data signal of the associated UE group.

For example, the near-end UE receives the data signal of the associated UE group from the base station, and the data signal includes the signal of the far-end UE and the signal of the near-end UE (the signal of the near-end UE). The near-end UE demodulates the data signal of the far-end UE from the received data signal according to the index of the RNTI of the far-end UE and the downlink control parameter of the far-end UE. Then, the near-end UE obtains the data signal of the near-end UE according to the data signal of the far-end UE, the downlink control parameter of the near-end UE, and the data signal of the associated UE group. For example, the near-end UE eliminates the data signal of the far-end UE from the data signal of the associated user equipment group. Then, the near-end UE demodulates a remaining signal according to the downlink control parameter, so as to recover an original data signal of the near-end UE (an original data signal of the near-end UE).

In part 207, the far-end UE demodulates the data signal of the far-end UE from the data signal of the associated UE group according to the second downlink control information.

For example, in the data signal of the associated user equipment group, power of the data signal of the far-end UE is much greater than power of the data signal of the near-end UE. In addition, after a relatively long transmission path, the far-end UE may treat the data signal of the near-end UE as an interference signal, and demodulate the data signal of the far-end UE directly from the overall signal of the associated user equipment group.

Based on the foregoing technical solution, in this embodiment of the present invention, a base station sends an index of an RNTI and a downlink control parameter of second UE to first UE, and does not need to send an RNTI that occupies relatively large space. In this way, the first UE may recover a signal of the first UE from a received overlapping signal according to the index of the RNTI and the downlink control parameter. Signaling transmission overheads can be reduced according to the communication method provided in this embodiment of the present invention.

Optionally, in an embodiment, the first downlink control information may further include time-frequency location information of the second downlink control information. In this case, when receiving the second downlink control information, the first UE may receive the second downlink control information according to the time-frequency location information.

For example, the first UE first performs blind detection and receives the downlink control information of the first UE (the first downlink control information). Then, the first UE obtains the time-frequency location information of the second downlink control information, and detects and receives the downlink control information of the second UE (the second downlink control information) on a time-frequency resource corresponding to the location information. In this way, when receiving the second downlink control information, the first UE does not need to perform blind detection or performs little blind detection, so that detection complexity is reduced.

Optionally, in another embodiment, the first UE first determines, from a preconfigured parameter comparison table, the RNTI of the second UE and a corresponding semi-statically configured parameter according to the index of the RNTI of the second UE. Then, the data signal of the second UE is obtained from the data signal of the associated UE group according to the RNTI of the second UE, the corresponding semi-statically configured parameter, and the downlink control parameter of the second UE.

For example, the base station preconfigures a parameter comparison table of the second UE on the first UE side by using radio resource control (RRC) signaling. The parameter comparison table may include an RNTI value corresponding to an index of an RNTI, and a corresponding semi-statically configured parameter. Specifically, the semi-statically configured parameter includes UE-specific semi-statically configured parameters, such as a transmission mode and a single-user power allocation parameter.

Optionally, in another embodiment, before the first downlink control information sent by the base station is received, an RNTI parameter comparison table of the second UE sent by the base station is received. In this case, when the data signal of the second UE is being determined, the RNTI of the second UE is determined according to the index of the RNTI of the second UE and the RNTI parameter comparison table of the second UE. Then, the data signal of the second UE is obtained according to the RNTI of the second UE, the downlink control parameter of the second UE, and the data signal of the associated UE group.

Optionally, in another embodiment, the first downlink control information further includes an identity of the first UE, and the identity is used to indicate that the first UE is cell-center UE.

Optionally, in another embodiment, the first downlink control information further includes pairing information and/or power allocation ratio information.

Optionally, in another embodiment, information included in the first downlink control information is coded by means of joint coding. For example, if a length of an index table of an RRC semi-static parameter such as an RNTI is 10, and a location information length is 22, in this case, a length obtained by jointly coding an index of an RNTI and location information is roundup $\log_2 (10 \times 22) = 8$ bits, and a total quantity of bits used to separately code the index of the RNTI and the location information is roundup $\log_2 (10)$ + roundup $\log_2 (22) = 9$. That is, by means of joint coding, a length of the first downlink control information may be further reduced, so as to reduce signal overheads.

Figure 3:
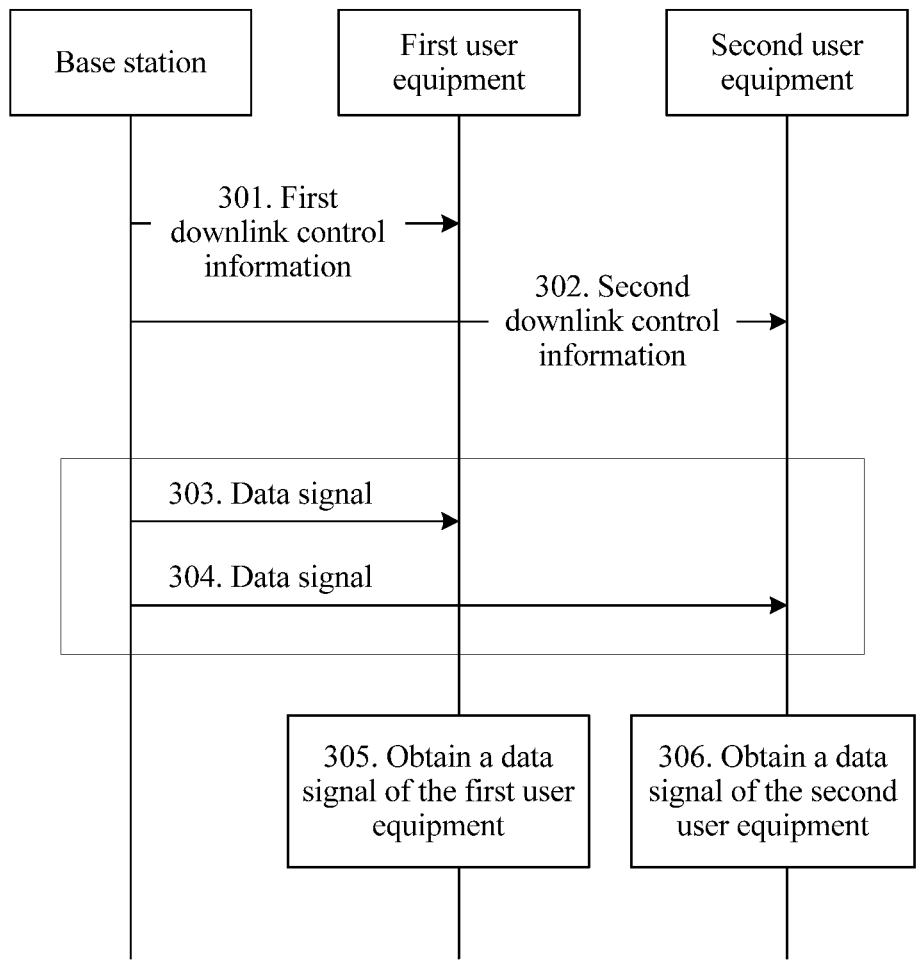
FIG. 3 is a schematic flowchart of a communication method based on non-orthogonal transmission according to another embodiment of the present invention.

FIG. 3 is a schematic flowchart of a communication method based on non-orthogonal transmission according to another embodiment of the present invention. The method may be applied to the network scenario shown in FIG. 1. Similar to that in FIG. 2, first UE and second UE are two UEs in an associated user equipment group (associated UE group). For ease of description, that the first UE serves as near-end UE and the second UE serves as far-end UE is still used as an example for the following description. It may be understood that this is not limited in this embodiment of the present invention.

301. A base station sends first downlink control information to first UE (near-end UE). The near-end UE receives the first downlink control information sent by the base station. The first downlink control information includes a downlink control parameter of the near-end UE and a downlink control parameter of the far-end UE. The near-end UE and the far-end UE belong to one associated user equipment group.

For example, near-end UE is paired with far-end UE to form an associated user equipment group. Then, transmission signals of the associated user equipment group are sent by being superimposed on a same time-frequency resource or partially overlapping time-frequency resources. The downlink control parameter includes a parameter required to demodulate data, and a type of the parameter may be different in different scenarios. Specifically, the downlink control parameter may include an MCS, a transmission mode, an RV, and the like, and this is not limited in this embodiment of the present invention.

It should be understood that UE may determine whether the UE is first UE according to a format of received downlink control information or information included in received downlink control information. For example, identity information is added into the first downlink control information to identify whether the UE is a near-end user; or when the first downlink control information includes an index of an RNTI, the UE is determined as first UE. It should be understood that these examples are merely intended to help a person skilled in the art better understand this embodiment of the present invention, but are not intended to limit the scope of this embodiment of the present invention.

302. The base station sends second downlink control information to second UE (far-end UE). The far-end UE receives the second downlink control information sent by the base station. The second downlink control information includes the downlink control parameter of the far-end UE.

In parts 303 and 304, the base station sends a data signal of the associated user equipment group. The data signal of the associated UE includes a data signal of the near-end UE and a data signal of the far-end UE.

For example, the base station combines the data signal of the far-end UE and the data signal of the near-end UE into one signal, and sends the signal to the near-end UE and the far-end UE in the associated UE group. The near-end UE and the far-end UE separately receive the data signal of the associated UE group.

In part 305, the near-end UE obtains the data signal of the near-end UE according to a preset radio network temporary identifier RNTI of the far-end UE, the downlink control parameter of the far-end UE, the data signal of the associated UE group, and the downlink control parameter of the near-end UE.

For example, the near-end UE determines the data signal of the second UE according to the preset radio network temporary identifier RNTI of the far-end UE, the downlink control parameter of the far-end UE, and the data signal of the associated UE group. Then, the data signal of the near-end UE is obtained according to the downlink control parameter of the near-end UE, the data signal of the far-end UE, and the data signal of the associated user equipment group.

For example, the near-end UE receives a data signal from the base station, and the data signal includes the signal of the far-end UE and the signal of the near-end UE (the signal of the near-end UE). Then, the data signal of the far-end UE is determined from the received data signal according to the preset RNTI of the far-end UE, a corresponding transmission mode, a single-user power allocation parameter, and the downlink control parameter. Then, the data signal of the far-end UE is eliminated from the data signal of the associated UE group. After the data signal of the far-end UE is eliminated, the UE demodulates a remaining signal according to the downlink control parameter, so as to recover an original data signal of the near-end UE (an original data signal of the near-end UE).

Specifically, the preset RNTI of the far-end UE may be a group/common RNTI, that is, the RNTI is applied to any other far-end UE paired with the near-end UE.

306. Similar to part 207, the far-end UE demodulates the data signal of the far-end UE from the data signal of the associated UE group according to the second downlink control information.

Based on the foregoing technical solution, in this embodiment of the present invention, a base station preconfigures an RNTI of second UE on a first UE side, and sends a downlink control parameter of the second UE to the first UE, and does not need to send an RNTI that occupies relatively large space. In this way, the first UE may recover a signal of the first UE from a received overlapping signal according to the preconfigured RNTI and the received downlink control parameter. Signaling overheads can be reduced according to the communication method provided in this embodiment of the present invention.

Optionally, in an embodiment, when the data signal of the first UE is being determined from the received data signal, the data signal of the second UE is first determined from the received data signal according to the preset RNTI of the second UE and the downlink control parameter of the second UE. Then, the data signal of the second UE is eliminated from the received data signal, so as to obtain the data signal of the first UE.

Similar to the embodiment shown in FIG. 2, optionally, the first downlink control information may further include an identity of the first UE, and the identity is used to indicate that the first UE is cell-center UE. The first downlink control information may further include power indicator information and/or pairing indication information. Information included in the first downlink control information may be coded by means of joint coding, so as to further reduce signal overheads. For details, refer to the description in the foregoing embodiment, and the details are not described herein again.

For the downlink control information (the first downlink control information and/or the second downlink control information) described in the foregoing embodiments, the following shows some examples of downlink control information formats. It should be noted that these examples are merely intended to help a person skilled in the art better understand the embodiments of the present invention, but are not intended to limit the scope of the embodiments of the present invention.

Implementation 1

Table 1 shows a format of downlink control information (DCI). First UE may use the format of the downlink control information shown in Table 1. As shown in Table 1, A bits may be used to indicate different transmission modes (TM). For example, two bits are used to indicate different transmission modes. A power indicator of B bits (for example, two or three bits) is used to indicate a current power allocation ratio of near-end UE and far-end UE. C bits (for example, three bits) indicate an RNTI index of the far-end UE. D bits indicate a location of a physical downlink control channel (PDCCH) of paired far-end UE. For example, five bits are used to indicate a PDCCH location of paired far-end UE. If there are 22 locations, and when a value indicated by the five bits is greater than 21 and the power indicator=1 (that is, a power percentage of the near-end UE is 100%), it indicates that there is no associated UE group, that is, the UE has no corresponding far-end UE. When the value indicated by the five bits is less than 21 and the power indicator 1, it indicates that the UE is near-end UE.

TABLE 1

| A bits | DCI2 (based on TM3 and TM4) |
| | DCI2 (based on TM4) |
| | DCI1 (based on TM2) |
| | DCI2A (based on TM3) |
| | Another existing DCI format |

TABLE 1-continued

| B bits | Power indicator |
| C bits | RNTI index of far-end UE |
| D bits | PDCCH location of far-end UE (22 locations) |
| | >21, if the power indicator = 1, there is no associated user equipment group. |
| | >21, if the power indicator ≠ 1, UE is a far-end user. |

In a power allocation scheme of the local UE (the first UE) and second UE, the UEs are notified of different user power allocation values by using two or three bits. Specifically, a power allocation value table may be notified to a user by using RRC or MAC signaling, or may be defined by using a protocol. A status in the power allocation value table may be used as a special indicator. For example, as shown in Table 2, when a power allocation indicator index=0, it indicates that there is no associated user equipment group.

TABLE 2

| | Index | | | | | | | |
|---|---|---|---|---|---|---|---|---|
| | 0 | 1 | 2 | 3 | 4 | 5 | 6 | 7 |
| P1/P | 1 | 0.05 | 0.1 | 0.15 | 0.2 | 0.25 | 0.3 | 0.35 |
| P2/P | 0 | 0.95 | 0.9 | 0.85 | 0.8 | 0.75 | 0.7 | 0.65 |

Similarly, the first UE may further obtain a parameter comparison table in advance by using RRC or MAC signaling. In this way, when DCI shown in Table 1 is received, a corresponding RNTI value may be determined according to an RNTI index in the DCI.

Implementation 2

The embodiment corresponding to Table 3 is basically the same as the embodiment corresponding to Table 1. To avoid repetition, only differences between Table 3 and Table 1 are described herein. In Table 1, in addition to indicating a PDCCH location of paired far-end UE, five bits may be used to implicitly indicate an identity of a current user (that is, unpaired or near-end UE) in combination with a value in a power indicator. In the embodiment corresponding to Table 3, bits that indicate a PDCCH location of far-end UE no longer have the function. In the embodiment corresponding to Table 3, when a value of V bits is X, it indicates that current UE has no paired user; or when a value of V bits is Y, it indicates that current UE is far-end UE. For example, X is used to indicate no paired user, and Y is used to indicate far-end UE. X, Y, or Z is a predefined value or a set of predefined values. When Y is a set of values, each value of Y may indicate one power allocation manner and one allocation ratio. When Z is a set of values, each value of Z may indicate one power allocation manner and one RNTI index.

TABLE 3

| M bits | DCI2 (based on TM3 and TM4) |
| | DCI2 (based on TM4) |
| | DCI1 (based on TM2) |
| | DCI2A (based on TM3) |
| V bits | Power indicator (this bit field may be omitted when a default power allocation ratio is used by a far-end user and a near-end user) |
| | RNTI index of far-end UE |
| | PDCCH location of far-end UE (22 locations and CCE levels) (including UE-specific and common search space) |
| | =X, there is no associated user equipment group. |

TABLE 3-continued

=Y, UE is far-end UE.
=Z, UE is a near-end UE user.

As shown in Table 3, first UE may also use a DCI format shown in Table 3.

Implementation 3

In DCI shown in Table 4, X bits are used as a power indicator or an indicator that indicates whether there is an associated user equipment group. For example, three bits are used as a power indicator or an indicator that indicates whether there is an associated user equipment group. Optionally, a power indicator bit may be used to implicitly indicate whether there is an associated user equipment group, and when the power indicator bit≠1, it indicates that there is an associated user equipment group. Conversely, when the power indicator=1, it indicates that there is no associated user equipment group. In addition, the DCI may further include bits that indicate an MCS and an RV version of far-end UE.

TABLE 4

| | |
|---|---|
| M bits | DCI2 (based on TM3 and TM4) |
| | DCI2 (based on TM4) |
| | DCI1 (based on TM2) |
| | DCI2A (based on TM3) |
| X bits | Power indicator/indicator that indicates whether there is an associated user equipment group |
| A bits | MCS of far-end UE |
| B bits | RV version of far-end UE |

First UE may also use a DCI format shown in Table 4. Specifically, according to a special combination of a power indicator and a far-end user MCS and RV, a local user may be determined as a paired far-end user or a paired near-end user, or determined to have no associated user equipment group.

For example:

paired far-end user: power indicator≠0, and far-end user MCS bits>=MCS1;

paired near-end user: power indicator≠0, and far-end user MCS bits<MCS1; or no associated user equipment group: power indicator=0. MCS1 is a predefined MCS value.

Due to different channel quality of the far-end user and the near-end user, an MCS possibly used by the far-end user and the near-end user may be within a specific range, and a system may limit, according to a simulated or real-time calculation, an MCS used by the far-end user and the near-end user during pairing within a specific range. Therefore, a quantity of bits used to notify an MCS or the like may be reduced.

When paired, the near-end user obtains demodulation information of power, an MCS, and an RV of the far-end user according to DCI of the near-end user; when the far-end user is paired, scrambling code used by a PDSCH of the far-end user is a group/common RNTI (group/common RNTI).

The group/common RNTI (group/common RNTI) is known by the near-end UE. The system notifies or broadcasts the group/common RNTI to the near-end UE and the far-end UE by predefining or using system signaling. However, an RNTI of the far-end UE rather than the RNTI (group/common RNTI) known by the near-end UE is used in CRC scrambling of a PDCCH of the far-end UE. Therefore, the system allocates two RNTIs to each UE that may be paired. One RNTI is used to demodulate a PDCCH and a PDSCH of a single user, and the other RNTI (group/common RNTI) is used to demodulate a PDSCH in a case of pairing.

Implementation 4

TABLE 5

| | |
|---|---|
| M bits | DCI2 (based on TM3 and TM4) |
| | DCI2 (based on TM4) |
| | DCI1 (based on TM2) |
| | DCI2A (based on TM3) |
| W bits | When a power indicator = 0, there is no associated user equipment group; or when a power indicator equals to another value, UE is second UE. |
| | (When a modulation scheme of the second UE is defined as QPSK, the bits in this bit field that are used by the power indicator may be omitted.) |

The second UE may use a DCI format shown in Table 5. M bits are used to indicate different transmission modes (TM). For example, two bits are used to indicate different transmission modes. W bits (for example, three bits) are used as a power indicator. Optionally, when the modulation scheme of the second UE is defined as QPSK, the W bits may be omitted, that is, the bits used by the power indicator may be omitted. That is, when a base station generates downlink control information according to the method shown in FIG. 2 or FIG. 3, W bits in the downlink control information may be omitted, so as to reduce signaling overheads.

The foregoing mainly describes the solutions provided in the embodiments of the present invention from a perspective of interaction between network elements. It may be understood that to implement the foregoing functions, each network element, such as UE or a base station, includes a corresponding module used to perform each function. A person skilled in the art should be aware that, in combination with the examples described in the embodiments disclosed in this specification, units and algorithm steps may be implemented by a combination of hardware and computer software. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Figure 4:
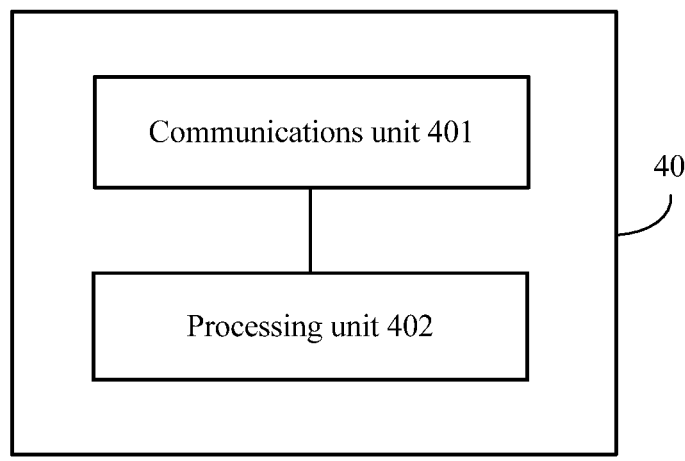
FIG. 4 is a schematic block diagram of user equipment according to an embodiment of the present invention.

FIG. 4 is a schematic block diagram of user equipment according to an embodiment of the present invention. As shown in FIG. 4, user equipment UE 40 includes a communications unit 401 and a processing unit 402. It should be understood that the user equipment 40 may serve as first UE in an associated user equipment group. The associated user group further includes at least second UE. Preferably, the first UE is near-end UE, the second UE is far-end UE, but this is not limited in the present invention. For ease of description, the following uses the near-end UE and the far-end UE as examples for description.

The communications unit 401 is configured to support communication between the UE and another network entity, for example, support communication between the UE and a base station. For example, in the embodiment shown in FIG. 2, the communications unit is configured to receive downlink control information (parts 201 and 203) and a data signal (part 204) that are sent by the base station. In the embodiment shown in FIG. 3, the communications unit is configured to receive first downlink control information (part 301) and a data signal (part 303) that are sent by the base station. For details, refer to the description in the foregoing embodiments, and the details are not described herein again.

The processing unit is configured to support the UE in performing the processing performed by UE in the foregoing embodiments. For example, in an optional design, the processing unit is configured to: when the UE serves as near-end UE, support the UE in obtaining a data signal of the near-end UE according to an index of an RNTI of far-end UE, a downlink control parameter of the far-end UE, a data signal of the associated UE group, and a control parameter of the near-end UE. The processing unit is further configured to: when the UE serves as far-end UE, demodulate a data signal of the far-end UE. For details, refer to the description in the foregoing embodiment shown in FIG. 2, and the details are not described herein again. For another example, in an optional design, the processing unit is configured to support the UE in performing an action performed by UE in the embodiment shown in FIG. 3, for example, step 305 or 306 described in FIG. 3.

Figure 5:
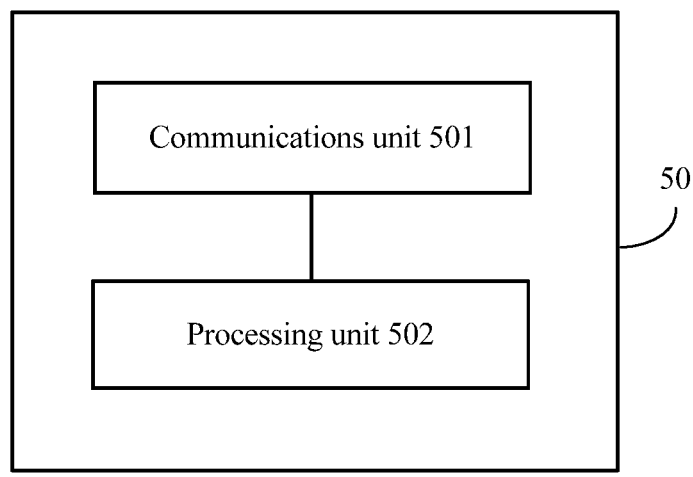
FIG. 5 is a schematic block diagram of a base station according to an embodiment of the present invention.

FIG. 5 is a schematic block diagram of a base station according to an embodiment of the present invention, and the base station is configured to implement the method of the embodiment shown in FIG. 2. As shown in FIG. 5, a base station 50 includes a communications unit 501 and a processing unit 502.

The communications unit 501 is configured to send first downlink control information, where the first downlink control information includes a downlink control parameter of first UE and an index of a radio network temporary identifier RNTI of second UE. The first UE and the second UE belong to one associated user equipment group. The first UE is near-end UE, and the second UE is far-end UE. For ease of description, the following uses the near-end UE and the far-end UE as examples for description.

For example, the processing unit 502 associates near-end UE with far-end UE to form an associated user equipment group. Then, transmission signals of the associated user equipment group are sent by being superimposed on a same time-frequency resource or partially overlapping time-frequency resources. The near-end UE may detect and receive the first downlink control information in a blind detection manner. The downlink control parameter includes a parameter required to demodulate data, and a type of the parameter may be different in different scenarios. Specifically, the downlink control parameter may include an MCS, a transmission mode, an RV, and the like, and this is not limited in this embodiment of the present invention.

It should be understood that UE may determine whether the UE is near-end UE according to a format of received downlink control information or information included in received downlink control information. For example, the first downlink control information may include identity information to identify whether UE that receives the first downlink control information is near-end UE; or when the first downlink control information includes an RNTI or an index of an RNTI, the UE that receives the first downlink control information is determined as near-end UE. It should be understood that these examples are merely intended to help a person skilled in the art better understand this embodiment of the present invention, but are not intended to limit the scope of this embodiment of the present invention.

The communications unit 501 is further configured to send second downlink control information. The second downlink control information includes a downlink control parameter of the second UE.

For example, the near-end UE may receive, in the blind detection manner, the downlink control parameter of the far-end UE for subsequent serial interference cancellation. Alternatively, the UE may obtain a location of the downlink control parameter of the far-end UE according to preconfigured information, and then receive the second downlink control information on a corresponding time-frequency resource. It should be noted that these examples are merely intended to help a person skilled in the art better understand this embodiment of the present invention, but are not intended to limit the scope of this embodiment of the present invention.

The communications unit 501 is further configured to send a data signal of the associated user equipment group, where the data signal of the associated user equipment group includes data of the near-end UE and data of the far-end UE.

For example, the base station combines a data signal of the far-end UE and a data signal of the near-end UE into one signal, and sends the signal to the near-end UE and the far-end UE in the associated user equipment group.

Based on the foregoing technical solution, in this embodiment of the present invention, a base station sends an index of an RNTI and a downlink control parameter of second UE to first UE, and does not need to send an RNTI that occupies relatively large space. In this way, the first UE may recover a signal of the first UE from a received overlapping signal according to the index of the RNTI and the downlink control parameter. Signaling overheads can be reduced according to the communication method provided in this embodiment of the present invention.

Optionally, in another embodiment, the first downlink control information further includes an identity of the first UE, and the identity is used to indicate that the first UE is cell-center UE.

Optionally, in another embodiment, the first downlink control information further includes time-frequency location information of the second downlink control information and/or power allocation ratio information.

Optionally, in another embodiment, information included in the first downlink control information is coded by means of joint coding.

For example, if a length of an index table of an RRC semi-static parameter such as an RNTI is 10, and a location information length is 22, in this case, a length obtained by jointly coding an index of an RNTI and location information is roundup $\log_2$ (10×22)=8 bits, and a total quantity of bits used to separately code the index of the RNTI and the location information is roundup $\log_2$ (10)+roundup $\log_2$ (22)=9. That is, by means of joint coding, a length of the first downlink control information may be further reduced, so as to reduce signal overheads.

An embodiment of the present invention further provides another user equipment, and the user equipment is configured to implement a communication method based on non-orthogonal transmission. Specifically, for a schematic block diagram of the user equipment, reference may be made to FIG. 4. A function of the user equipment is described below with reference to FIG. 4.

The communications unit 401 is configured to receive downlink control information sent by a base station. The downlink control information includes a downlink control parameter of the user equipment 40 and a downlink control parameter of second UE. The user equipment is first UE in an associated user equipment group, and the associated user equipment group further includes the second UE. The first UE is near-end UE, and the second UE is far-end UE. For ease of description, the following uses the near-end UE and the far-end UE as examples for description.

For example, near-end UE is paired with far-end UE to form an associated UE group. Then, transmission signals of the associated user equipment group are sent by being superimposed on a same time-frequency resource or partially overlapping time-frequency resources. The downlink control parameter includes a parameter required to demodulate data, and a type of the parameter may be different in different scenarios. Specifically, the downlink control parameter may include an MCS, a transmission mode, an RV, and the like, and this is not limited in this embodiment of the present invention.

It should be understood that UE may determine whether the UE is first UE according to a format of received downlink control information or information included in received downlink control information. For example, identity information is added into first downlink control information to identify whether the UE is a near-end user; or when first downlink control information includes an index of an RNTI, the UE is determined as first UE. It should be understood that these examples are merely intended to help a person skilled in the art better understand this embodiment of the present invention, but are not intended to limit the scope of this embodiment of the present invention.

The communications unit 401 is further configured to receive a data signal of the associated user equipment group sent by the base station. The data signal of the associated user equipment group includes a data signal of the user equipment 40 and a data signal of the far-end UE.

For example, the base station combines a data signal of the far-end UE and a data signal of the near-end UE into one signal, and sends the signal to the near-end UE and the far-end UE in the associated user equipment group.

The processing unit 402 is configured to obtain the data signal of the far-end UE according to a preset radio network temporary identifier RNTI of the far-end UE, the downlink control parameter of the far-end UE, and the data signal of the associated UE group.

For example, the UE receives a data signal from the base station, and the data signal includes the signal of the far-end UE and the signal of the near-end UE (the signal of the near-end UE). Then, the data signal of the far-end UE is determined from the received data signal according to the preset RNTI of the far-end UE, a corresponding transmission mode, a single-user power allocation parameter, and the downlink control parameter.

The processing unit 402 is further configured to obtain a data signal of a communications device according to a downlink control parameter of the communications device, the data signal of the far-end UE, and the data signal of the associated user equipment group.

For example, the data signal of the far-end UE is eliminated from the data signal of the associated user equipment group. After the data signal of the far-end UE is eliminated, the UE demodulates a remaining signal according to the downlink control parameter, so as to recover an original data signal of the near-end UE (an original data signal of the near-end UE).

Based on the foregoing technical solution, in this embodiment of the present invention, a base station preconfigures an RNTI of second UE on a first UE side, and sends a downlink control parameter of the second UE to the first UE, and does not need to send an RNTI that occupies relatively large space. In this way, the first UE may recover a signal of the first UE from a received overlapping signal according to the preconfigured RNTI and the received downlink control parameter. Signaling overheads can be reduced according to the communication method provided in this embodiment of the present invention.

An embodiment of the present invention further provides another base station, and the base station is configured to implement a communication method based on non-orthogonal transmission. Specifically, for a schematic block diagram of the user equipment, reference may be made to FIG. 5. A function of the base station is described below with reference to FIG. 5.

A communications unit 501 is configured to send downlink control information. The downlink control information includes a downlink control parameter of first UE and a downlink control parameter of second UE. The first UE and the second UE belong to one associated UE group. The first UE is near-end UE, and the second UE is far-end UE. For ease of description, the following uses the near-end UE and the far-end UE as examples for description.

For example, a processing unit 502 pairs near-end UE with far-end UE to form an associated user equipment group. Then, transmission signals of the associated user equipment group are sent by being superimposed on a same time-frequency resource or partially overlapping time-frequency resources.

The downlink control parameter includes a parameter required to demodulate data, and a type of the parameter may be different in different scenarios. Specifically, the downlink control parameter may include an MCS, a transmission mode, an RV, and the like, and this is not limited in this embodiment of the present invention.

It should be understood that UE may determine whether the UE is first UE according to a format of received downlink control information or information included in received downlink control information. For example, identity information is added into first downlink control information to identify whether the UE is a near-end user; or when first downlink control information includes an index of an RNTI, the UE is determined as first UE. It should be understood that these examples are merely intended to help a person skilled in the art better understand this embodiment of the present invention, but are not intended to limit the scope of this embodiment of the present invention.

The communications unit 501 is further configured to send a data signal of the associated user equipment group. A data signal of the far-end UE in the data signal of the associated user equipment group is scrambled by using a preset radio network temporary identifier RNTI of the far-end UE.

Based on the foregoing technical solution, in this embodiment of the present invention, a base station preconfigures an RNTI of second UE on a first UE side, and sends a downlink control parameter of the second UE to the first UE, and does not need to send an RNTI that occupies relatively large space. In this way, the first UE may recover a signal of the first UE from a received overlapping signal according to the preconfigured RNTI and the received downlink control parameter. Signaling overheads can be reduced according to the communication method provided in this embodiment of the present invention.

Optionally, in an embodiment, the downlink control information further includes an identity of the first UE, and the identity is used to indicate that the first UE is cell-center UE.

Optionally, in another embodiment, the downlink control information further includes pairing information and/or power allocation ratio information.

Optionally, in another embodiment, information included in the downlink control information is coded by means of joint coding.

An embodiment of the present invention further provides a communications system of a communication method based on non-orthogonal transmission, and the communications system includes the user equipment and the base station that are described above.

Figure 6:
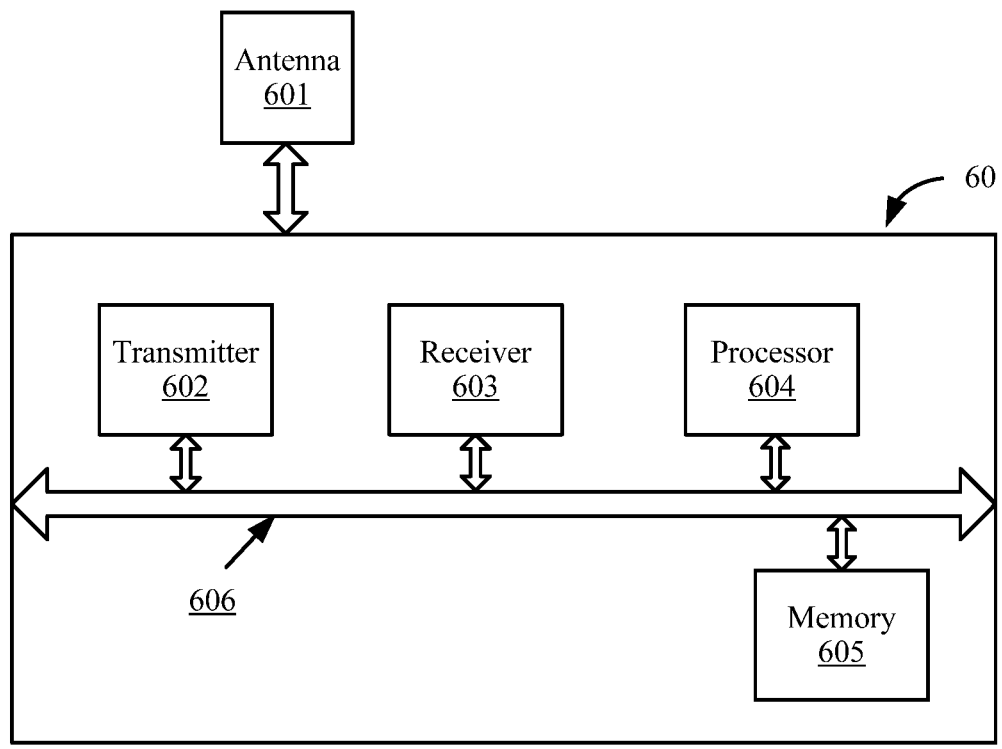
FIG. 6 is a schematic block diagram of a device based on non-orthogonal transmission according to another embodiment of the present invention.

FIG. 6 is a schematic block diagram of a device based on non-orthogonal transmission according to another embodiment of the present invention.

A device 60 in FIG. 6 may be configured to implement steps and methods in the foregoing method embodiments. In this embodiment shown in FIG. 6, the device 60 includes an antenna 601, a transmitter 602, a receiver 603, a processor 604, and a memory 605. The processor 604 controls an operation of the device 60 and may be configured to process a signal. The memory 605 may include a read-only memory and a random access memory, and provides an instruction and data for the processor 604. The transmitter 602 and the receiver 603 may be coupled to the antenna 601. All components of the device 60 are coupled together by using a bus system 606, where the bus system 606 may include a power bus, a control bus, and a status signal bus in addition to a data bus. However, for clarity of description, various buses are marked as the bus system 606 in the figure.

For example, the device 60 may be the user equipment shown in FIG. 4, or may be the base station shown in FIG. 5. The memory 605 may store a program or an instruction to perform a function of the user equipment shown in FIG. 4. To avoid repetition, details are not described herein.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method based on non-orthogonal transmission, comprising:
   receiving, by a first user equipment (UE) from a base station, downlink control information that includes:
   a first downlink control parameter of the first UE,
   a second downlink control parameter of a second UE, and
   a first identity of the first UE, the first identity of the first UE indicating that the first UE is a cell-center UE, the first UE and the second UE belonging to an associated user equipment group, the second UE being a cell-edge UE;
   receiving, by the first UE from the base station, a data signal of the associated user equipment group, the data signal of the associated user equipment group including a first data signal of the first UE and a second data signal of the second UE; and obtaining, by the first UE, the first data signal of the first UE according to the data signal of the associated user equipment group, and the first downlink control parameter of the first UE.

2. The method according to claim 1, wherein the downlink control information further includes pairing information and power allocation ratio information.

3. The method according to claim 2, wherein the pairing information and the power allocation ratio information are notified by 2 bits.

4. The method according to claim 3, wherein, when the pairing information and the power allocation ratio information are set to a value of 0, the pairing information and the power allocation ratio information indicate that there is no associated user equipment group.

5. The method according to claim 1, wherein the downlink control information does not include a radio network temporary identifier (RNTI) of the second UE.

6. A user equipment (UE), comprising:
a non-transitory computer-readable memory having executable instructions stored thereon; and
a processor coupled to the non-transitory computer-readable memory, wherein the processor executes the executable instructions to:
receive, from a base station, downlink control information including:
a first downlink control parameter of the UE,
a second downlink control parameter of a second UE, and
a first identity of the UE, the first identity of the UE indicating that the UE is a cell-center UE, the UE being a first UE in an associated user equipment group, the second UE being a cell-edge UE, and the associated user equipment group further including the second UE;
receive, from the base station, a data signal of the associated user equipment group, the data signal of the associated user equipment group including a first data signal of the UE and a second data signal of the second UE; and
obtain the first data signal of the UE according to the data signal of the associated user equipment group, and the first downlink control parameter of the UE.

7. The user equipment according to claim 6, wherein the downlink control information further includes pairing information and power allocation ratio information.

8. The user equipment according to claim 7, wherein the pairing information and the power allocation ratio information are notified by 2 bits.

9. The user equipment according to claim 8, wherein, when the pairing information and the power allocation ratio information are set to a value of 0, the pairing information and the power allocation ratio information indicate that there is no associated user equipment group.

10. The user equipment according to claim 6, wherein the downlink control information does not include a radio network temporary identifier (RNTI) of the second UE.

11. A communication method based on non-orthogonal transmission, comprising:
sending, by a base station, downlink control information that includes:
a first downlink control parameter of a first user equipment (UE),
a second downlink control parameter of a second UE, and
a first identity of the first UE, the first identity of the first UE indicating that the first UE is a cell-center UE, the first UE and the second UE belonging to an associated user equipment group, the second UE being a cell-edge UE; and
sending, by the base station, a data signal of the associated user equipment group including a first data signal of the first UE and a second data signal of the second UE, the second data signal of the second UE being scrambled using a preset radio network temporary identifier (RNTI) of the second UE.

12. The method according to claim 11, wherein the downlink control information further includes pairing information and power allocation ratio information.

13. The method according to claim 12, wherein the pairing information and the power allocation ratio information are notified by 2 bits.

14. The method according to claim 13, wherein, when the pairing information and the power allocation ratio information are set to a value of 0, the pairing information and the power allocation ratio information indicate that there is no associated user equipment group.

15. The method according to claim 11, wherein the downlink control information does not include the preset RNTI of the second UE.

16. A base station, comprising:
a non-transitory computer-readable memory having executable instructions stored thereon; and
a processor coupled to the non-transitory computer-readable memory, wherein the processor executes the executable instructions to:
send downlink control information that includes:
a first downlink control parameter of a first user equipment (UE),
a second downlink control parameter of a second UE, and
a first identity of the first UE, the first identity of the first UE indicating that the first UE is a cell-center UE, the first UE and the second UE belonging to an associated user equipment group, the second UE being a cell-edge UE; and
send a data signal of the associated user equipment group including a first data signal of the first UE and a second data signal of the second UE, the second data signal of the second UE being scrambled using a preset radio network temporary identifier (RNTI) of the second UE.

17. The base station according to claim 16, wherein the downlink control information further includes pairing information and power allocation ratio information.

18. The base station according to claim 17, wherein the pairing information and the power allocation ratio information are notified by 2 bits.

19. The base station according to claim 17, wherein, when the pairing information and the power allocation ratio information are set to a value of 0, the pairing information and the power allocation ratio information indicate that there is no associated user equipment group.

20. The base station according to claim 16, wherein the downlink control information does not include the preset RNTI of the second UE.

* * * * *